United States Patent
Roy et al.

(10) Patent No.: US 11,550,946 B2
(45) Date of Patent: Jan. 10, 2023

(54) SEARCHABLE SETS OF DATA USING TRUSTED EXECUTION ENVIRONMENT

(71) Applicant: FUJITSU LIMITED, Kawasaki (JP)

(72) Inventors: Arnab Roy, Santa Clara, CA (US); Hart Montgomery, Redwood City, CA (US); Avradip Mandal, Sunnyvale, CA (US)

(73) Assignee: FUJITSU LIMITED, Kawasaki (JP)

( * ) Notice: Subject to any disclaimer, the term of this patent is extended or adjusted under 35 U.S.C. 154(b) by 35 days.

(21) Appl. No.: 17/235,884

(22) Filed: Apr. 20, 2021

(65) Prior Publication Data

US 2022/0335150 A1    Oct. 20, 2022

(51) Int. Cl.
   *G06F 21/00* (2013.01)
   *G06F 21/62* (2013.01)
   *H04L 9/08* (2006.01)
   *G06F 21/60* (2013.01)

(52) U.S. Cl.
   CPC ........ *G06F 21/6227* (2013.01); *G06F 21/602* (2013.01); *H04L 9/0825* (2013.01)

(58) Field of Classification Search
   None
   See application file for complete search history.

(56) References Cited

U.S. PATENT DOCUMENTS

| | | | | |
|---|---|---|---|---|
| 2014/0090081 | A1* | 3/2014 | Mattsson | G06F 21/6227 726/27 |
| 2019/0087432 | A1* | 3/2019 | Sion | G06F 16/21 |
| 2019/0207752 | A1* | 7/2019 | Mandal | H04L 9/3234 |

OTHER PUBLICATIONS

Kim, Sam, et al. "Function-hiding inner product encryption is practical." International Conference on Security and Cryptography for Networks. Springer, Cham, 2018.
Boneh, Dan, Amit Sahai, and Brent Waters. "Functional encryption: Definitions and challenges." Theory of Cryptography Conference. Springer, Berlin, Heidelberg, 2011.
Datta, Pratish, Ratna Dutta, and Sourav Mukhopadhyay. "Functional encryption for inner product with full function privacy." Public-Key Cryptography-PKC 2016. Springer, Berlin, Heidelberg, 2016. 164-195.
Garg, S., Gentry, C., Halevi, S., Raykova, M., Sahai, A., & Waters, B. (2016). Candidate indistinguishability obfuscation and functional encryption for all circuits. SIAM Journal on Computing, 45(3), 882-929.

(Continued)

*Primary Examiner* — Andrew J Steinle
(74) *Attorney, Agent, or Firm* — Maschoff Brennan

(57) ABSTRACT

A method may include exchanging a secret symmetric key (SSK) between a first trusted execution environment (TEE) of a first system, a second TEE of a second system and a third TEE of a third system. The method may also include receiving, by the first system, an encrypted first set of data from the second system. The method may also include decrypting, by the first TEE, the encrypted first set of data using the SSK. The method may also include receiving, by the first system, an encrypted query from the third system. The method may also include decrypting, by the first TEE, the encrypted query using the SSK. The method may also include determining, by the first TEE, a query result to the decrypted query using index sets. The method may also include sending, by the first TEE, the encrypted query result to the third system.

20 Claims, 9 Drawing Sheets

(56) References Cited

OTHER PUBLICATIONS

Chaum D., van Heyst E. (1991) Group Signatures. In: Davies D.W. (eds) Advances in Cryptology—Eurocrypt '91 Eurocrypt 1991. Lecture Notes in Computer Science, vol. 547. Springer, Berlin, Heidelberg.

Dwork, Cynthia. "Differential privacy: A survey of results." International conference on theory and applications of models of computation. Springer, Berlin, Heidelberg, 2008.

\* cited by examiner

SEARCHABLE SETS OF DATA USING TRUSTED EXECUTION ENVIRONMENT

The embodiments discussed in the present disclosure are related to searchable sets of data using trusted execution environments.

BACKGROUND

Sets of data provide organized collections of data. A database may be an example of a set of data. The data located in a set of data may be queried to provide relevant segments of information to the requestor. Further, it may be desirable to maintain security and control with respect to data included in sets of data. For example, some data located in a set of data may be private or confidential.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

In an example embodiment, a method may include exchanging, by a first trusted execution environment (TEE) of a first system, a secret symmetric key (SSK) with a second TEE of a second system and a third TEE of a third system. The method may also include receiving, by the first system, an encrypted first set of data from the second system, where the first encrypted set of data may be organized in rows, and where the encrypted first set of data may be encrypted by the second TEE using the SSK. The method may also include accessing, by the first TEE, the encrypted first set of data on the first system. The method may also include decrypting, by the first TEE, the encrypted first set of data using the SSK. The method may also include generating, by the first TEE, index sets of the decrypted first set of data, where the index sets may be configured to enable searching of the first set of data. The method may also include generating, by the first TEE, encrypted index sets by encrypting the index sets using the SSK. The method may also include sending, by the first TEE, the encrypted index sets to the first system. The method may also include receiving, by the first system, an encrypted query from the third system, where the encrypted query may be encrypted by the third TEE using the SSK. The method may also include accessing, by the first TEE, the encrypted query and the encrypted index sets on the first system. The method may also include decrypting, by the first TEE, the encrypted query and the encrypted index sets using the SSK. The method may also include determining, by the first TEE, a query result to the decrypted query using the index sets, where the query result may include determined indices of the first set of data which may be responsive to the decrypted query. The method may also include sending, by the first TEE, the encrypted query result to the third system, where the encrypted query result may comprise rows of the encrypted first set of data that correspond to the determined indices.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
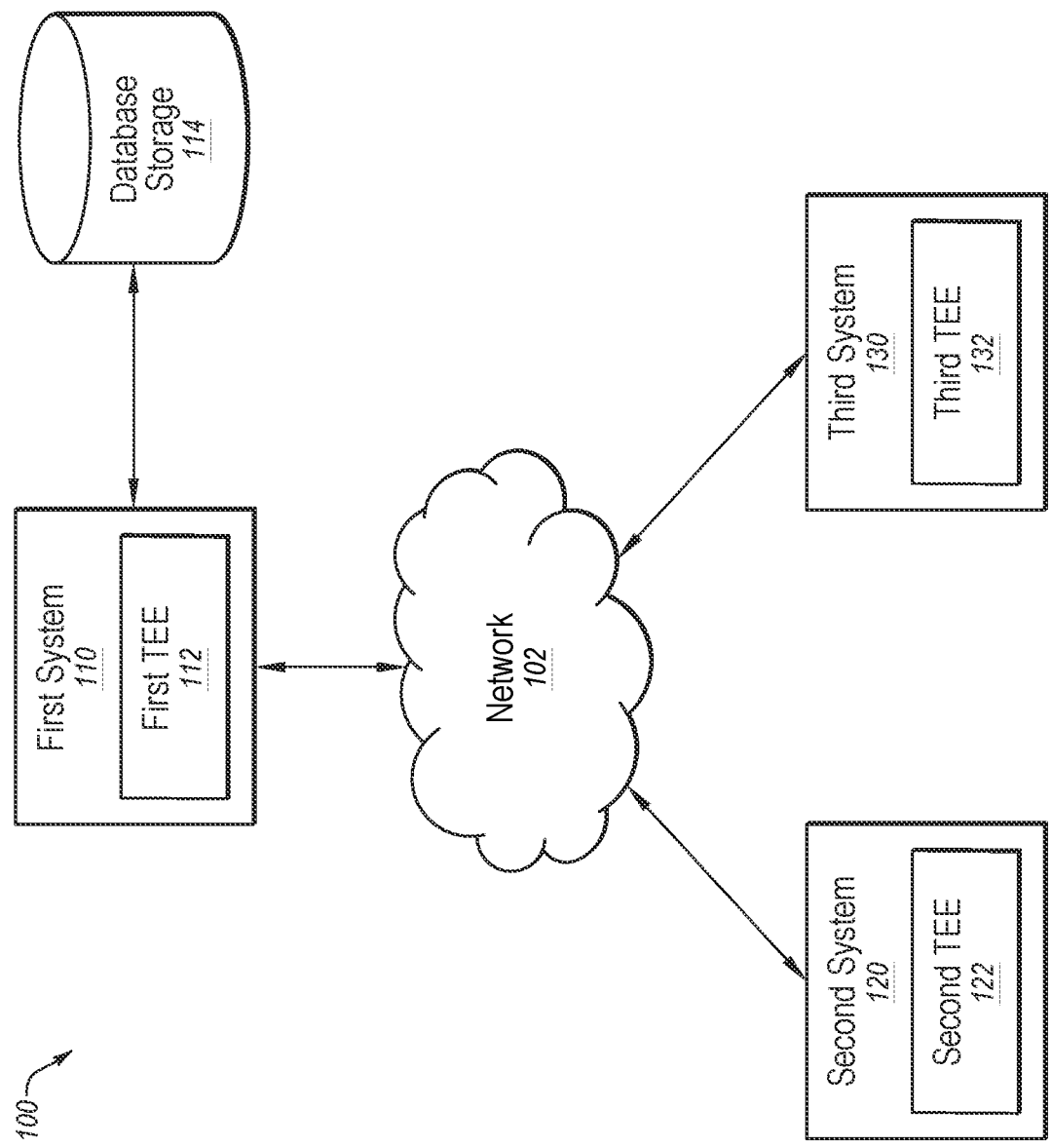
FIG. 1 illustrates a block diagram of an example operating environment that includes a searchable set of data using trusted execution environments.

Sets of data provide an organized structure to store various forms and amounts of data. For instance, a database may be an example of a set of data. In the present disclosure, reference to a "database" and associated operations may thus serve as an example of sets of data and associated operations that may be performed with respect thereof. For example, some sets of data may include inventory items and quantities for a given business. Due to the organized structure of sets of data, it may be possible to request data included therein, or information related to the data, using queries. Queries may be plain text requests submitted to a set of data configured to generate responsive data from the set of data. In some circumstances, sets of data may include sensitive and/or private data. For example, a hospital may include sets of data that includes patient records and other sensitive medical information. However, a main business function of a hospital is providing medical services, not hosting data storage. In some circumstances, it may be beneficial to the hospital to utilize a remote system for data storage, such as by using a cloud-based storage service. However, as hospital data may include sensitive and/or private data, it may be desirable. For example, in some instances, regulations may exist that sensitive and/or private data remain confidential when stored in such locations as cloud-based storage services.

In accordance with one or more embodiments of the present disclosure, portions of one or more system processors may include secure areas called trusted execution environments, or TEEs. The TEEs may be configured to perform operations that the system processor may be unable to perform. For example, a TEE may have access to an encryption scheme to which the system processor does not have access and the TEE may be able to encrypt and decrypt data that the system processor may not be able to view or otherwise manipulate. In these and other embodiments, data contained within the TEE may be obscured from the system processor such that the system processor may be unable to determine the contents within the TEE. Alternatively or additionally, operations performed within the TEE may be completed without the system processor being able to determine the functions and operations thereof. Multiple TEEs may be configured to communicate with each other, and may use an encryption scheme in the communications, such that the related system processors are unable to determine the underlying data of the encrypted data.

For example, a first system (such as a hospital system) may encrypt a set of data (such as patient records) using a symmetric key encryption scheme within a first TEE, which symmetric key may have already been shared with a second TEE. The encrypted data may then be sent to a storage system. The storage system may not be able to determine any information about the underlying data of the encrypted data sent from the first TEE. Further, encrypted queries may be generated by TEEs that have access to the symmetric key and may be directed to encrypted data stored on the storage system (the queries may originate from the hospital or some third party that is granted access to the encrypted data). In those instances, the storage system receiving the encrypted query may not have access to the underlying query and instead, may send the encrypted query to the related TEE for handling.

For example, the storage system holding encrypted hospital records may receive an encrypted query from either the hospital system or a third-party system, to determine some underlying data of the encrypted set of data. However, due to the encryption, the storage system may be unable to determine any information from the underlying query and may send the encrypted query on to the TEE related to the storage system. The TEE, using the symmetric key shared between the other TEEs, may decrypt the encrypted query, and determine responsive rows to the query from the encrypted set of data. Having determined responsive rows, the TEE may send the query response, as responsive rows, back to the system that requested the data using an encrypted query, the query response may still be encrypted so as to shield the underlying data from view of the storage system and the requesting system. In some embodiments, one, some, or all of the encrypted set of data, the encrypted query, and the encrypted query response may include dummy rows such that any system may be unable to determine the amount of underlying data included in the set of data, the query, or the query response.

In some circumstances, embodiments of the present disclosure may facilitate improved security and privacy for computing devices, including for data stored in a set of data by maintaining an encryption scheme on the data. For example, sensitive data, such as hospital patient records, may be encrypted and sent to a data storage system for storage, such that the data storage system is unable to access the contents of the encrypted data while still permitting queries to the set of data while remaining in an encrypted form. In addition, embodiments of the present disclosure may facilitate improved security and privacy for queries requesting data from the set of data by maintaining an encryption scheme on the query. For example, a hospital may authorize a research group to access patient records stored at a storage system. The research group may submit an encrypted query to the storage system, such that the data storage system is unable to access the contents of the encrypted query.

In some embodiments, dummy rows may be added to the set of data, or to the query, or to the query response, or any of the three in combination, to facilitate additional security and privacy by not compromising the amount of data being transferred. For example, A set of data may include 10 rows of data and may also include 10 dummy rows. A storage system that receives all 20 rows as encrypted data may only know that 20 rows of data were sent for storage.

In these and other embodiments, group signatures may be included with submitted queries which may facilitate another layer of privacy and security by concealing the identity of the system, device, or user submitting the query. For example, a third-party research group may prepare an encrypted query directed to encrypted data stored on a storage system and may sign the encrypted query with a group signature. The storage system may only determine that the encrypted query is a valid request, and may not be able to determine the system, device, or user from whence the query originated. In some embodiments, a symmetric encryption scheme may enable embodiments of the present disclosure to take less time to execute the encryption and decryption process when compared to an asymmetric encryption scheme. Consequently, the symmetric encryption scheme may be advantageous when large amounts of data are being encrypted and transferred as described in the present disclosure. In some embodiments, a group signature may be signed any member of the group. Alternatively or additionally, the system, device, or user that signed with the group signature may remain anonymous to all parties that may not have access to an associated group signature master key. For example, a first group member may sign an encrypted query with the group signature and neither of a second group member nor a first external member may determine which member of the group provided the group signature. Continuing the example, a third group member may have access to a master key associated with the group signature, and the third group member may determine that the first group member signed the encrypted query with the group signature.

Additionally, enabling devices that generate sensitive data to store sensitive data on systems configured for data storage may free up resources on the generating devices, allowing the systems storing large amounts of data to be optimized for such and enjoy economies of scale. For example, a device that may generate hospital patient records, may encrypt and send the data to a system, and may maintain system resources that may have otherwise been used to store the data. Additionally, when another device attempts to query the encrypted data, the device that generated the patient records may not be tasked with searching the data and generating a response, which may also reduce system resource drain.

FIG. 1 illustrates an example environment 100 that includes a searchable set of data using trusted execution environments (TEEs), in accordance with at least one embodiment described in the present disclosure. The environment 100 may include a network 102, a first system 110 which may include a first TEE 112, a data storage 114, a second system 120 which may include a second TEE 122, and a third system 130 which may include a third TEE 132.

The network 102 may be configured to communicatively couple the first system 110, the second system 120, and the third system 130. In some embodiments, the network 102 may be any network or configuration of networks configured to send and receive communications between systems. In some embodiments, the network 102 may include a wired network, an optical network, and/or a wireless network, and may include numerous different configurations, including multiple different types of networks, network connections, and protocols to communicatively couple systems in the environment 100.

Each of the first system 110, the second system 120, and the third system 130 may include any electronic or digital computing system. For example, each of the first system 110, the second system 120, and the third system 130 may include a desktop computer, a laptop computer, a smartphone, a mobile phone, a tablet computer, server, a processing system, or any other computing system or set of computing systems that may be used for performing the operations described in this disclosure and for communicating data between the first system 110, the second system 120, and the third system 130. An example of such a computing system is described below with reference to FIG. 6.

In some embodiments, the first system 110 may include the first TEE 112. In an example embodiment, the first system 110 may include a server system. In instances in which the first system 110 is a server system, the server system may be configured to communicate with other systems, such as a data generating client and a data querying client, which may include sending and receiving data. Alternatively or additionally, the server system may be configured to store data in and retrieve data from a data storage device, such as the data storage 114. In some embodiments, the first TEE 112 may be a partition of the system processor of the first system 110. For example, a TEE may occupy an isolated portion of a system processor, running in parallel with the system processor. In some embodiments, the first TEE 112 may be a secure area of the system processor of the first system 110. In these and other embodiments, the first TEE 112 may act as a black box unit as viewed by the first system 110, or any other component, device, or system external to the first TEE 112. For example, a TEE may be configured to perform operations without the disclosing any details of the operations, functions, results, etc., to its corresponding system. Further, the corresponding system may be unable to obtain details related to the operations, functions, results, etc., within the TEE. In some embodiments, as an example, the first TEE 112 may employ ARM® TrustZone®, Intel® Software Guard Extensions (SGX) technologies, or any other suitable technology.

In some embodiments, the second system 120 may include the second TEE 122. In an example embodiment, the second system 120 may include a data generating client. In instances in which the second system 120 is a data generating client, the data generating client may be configured to communicate with other devices or systems, such as a server system (e.g., the first system 110 operating as a server system). In these or other embodiments, the data generating client may send data to the server system (or any other suitable system or device), for data storage and/or future access. The relationship and function between the second system 120 and the second TEE 122 may be analogous to the relationship and function between the first system 110 and the first TEE 112.

In some embodiments, the third system 130 may include the third TEE 132. In an example embodiment, the third system 130 may include a data querying client. In instances in which the third system 130 is a data querying client, the data querying client may be configured to communicate with other devices or systems, such as a server system (e.g., the first system 110 operating as a server system). The data querying client may request data from the server system (or any other suitable system or device), to receive the data for additional uses, such as data processing and analytics. In these or other embodiments, the data requested from the server system may be data that is sent to the server system by a data generating client (e.g., the second system 120 operating as a data generating client). The relationship and function between the third system 130 and the third TEE 132 may be analogous to the relationship between the first system 110 and the first TEE 112.

In some embodiments, the first system 110 and the data storage 114 may be communicatively coupled to allow data to be passed between the first system 110 and the data storage 114. In some embodiments, the data passed between the first system 110 and the data storage 114 may be encrypted data. The data storage 114 may be configured to be responsive to commands issued from either the first system 110 or the first TEE 112. The data storage 114 may be configured to send encrypted data to the first system 110 in response to being requested by the first system 110. In these and other embodiments, the first system 110 may request data from the data storage 114 using an encrypted query. In some embodiments, the data storage 114 may be configured to receive and store encrypted data sent from the first system 110.

In some embodiments, the communication link between the first system 110 and the data storage 114 may be any configuration of networking elements configured to send and receive communications between the first system 110 and the data storage 114. In these and other embodiments, data may be passed between the first system 110 and the data storage 114 using methods common in digital data transfer. Such systems and/or methods may include PCI, PCI Express, Ethernet, wireless transfer such as Bluetooth®, Wi-Fi, WiMAX, cellular communications, and the like.

The data storage 114 may be configured to store data, which may include encrypted data. In some embodiments, the data storage 114 may store data organized in rows. In some embodiments, the data storage 114 may be indexed that may enable faster and/or more efficient searching. Alternatively or additionally, the index of the data storage 114 may be stored as an encrypted index, which may only be accessible by a system/device capable of decrypting the index. For example, data in a data storage device may first be indexed and then the index may be encrypted. Continuing the example, when a query seeking specific data is presented to the data storage device, the encrypted index may be decrypted, which may result in an index that may be used to efficiently search the data in the data storage device. The data storage 114 may include computer-readable storage media such as Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store data or data structures which may be accessed by a general-purpose or special-purpose computer.

In some embodiments, data may be a collection of information, including one or more elements. In some embodiments, a first data may be organized with other data which may be related to the first data, into a set of data. In some embodiments, the first data may be paired with the data related to the first data, such as a key-value pair.

For example, a first patient record from a hospital may be first data that includes such elements as age, diagnosis, treatment, and results. In the example, the first patient may be the first key and the related data, e.g., age, diagnosis, treatment, and results, may constitute the first pair related to the first key. The first patient record may be combined with a second patient record, which may include similar elements to the first patient record including age, diagnosis, treatment, and results, resulting in a set of data. Additional patient records may be added to the first patient record and the second patient record, increasing the amount of data in the set of data.

In some embodiments, a set of data may be structured such that information related to a single entry may be located on a single row, delineated by unique elements into columns. For example, a first patient may occupy a first row of the set of data, with the patient's age, diagnosis, treatment, and result each occupying a unique column of the first row. In some embodiments, the set of data may be organized as a database. For example, the patient records may be organized into a database in some embodiments.

In some embodiments, a system storing a set of data may be configured to receive query requests directed to the data included in the set of data. For example, a doctor at the hospital may query the system storing the set of data for all information related to the second patient. Alternatively or additionally, queries may include combined searches for data in the set of data. For example, a doctor at the hospital may query the system storing the set of data for patients diagnosed with cancer and patients prescribed radiation therapy as a treatment. As described, queries may be directed to either elements in the columns or entries in the rows. In some embodiments, the system storing the set of data may be configured to provide a level of security to the data included therein. For example, the system storing the set of data may monitor and record requests to access data and may monitor and record various interactions a user accessing the data does with the data.

In some embodiments, the first system 110, the second system 120, and the third system 130, in addition to the first TEE 112, the second TEE 122, and the third TEE 132 may be configured to communicate and share data over the network 102 as described above. In some embodiments, the first TEE 112, the second TEE 122, and the third TEE 132 may be configured to encrypt and decrypt data such that private data may be made inaccessible, except to systems and devices which are granted access. In these and other embodiments, a first set of data may be received at the first system 110, and the first system 110 may store the first set of data. In some embodiments, the received first set of data may be encrypted, such as by the second TEE 122, such that the underlying data of the encrypted first set of data may be inaccessible to the first system 110. In these and other embodiments, the first TEE 112 may decrypt the encrypted first set of data. Further, the first system 110 may receive encrypted queries, such as an encrypted query from a remote system like the third TEE 132. In some embodiments, the first TEE 112 may access the encrypted query from the first system 110 and may be able to determine responsive rows to encrypted queries that are received. In some embodiments, the underlying data of the encrypted first set of data and the underlying query of the encrypted query may be inaccessible to the first system 110. Additional details of the functions described above are provided with respect to FIGS. 2A, 2B, and 2C below.

Modifications, additions, or omissions may be made to the environment 100 without departing from the scope of the present disclosure. For example, in some embodiments, the environment 100 may not include the third system 130. In some embodiments, the third system 130 may include a data storage to which it is configured to communicate. Alternatively or additionally, the three systems illustrated and described are merely given as an example number of systems and is not meant to be limiting.

Figure 2A:
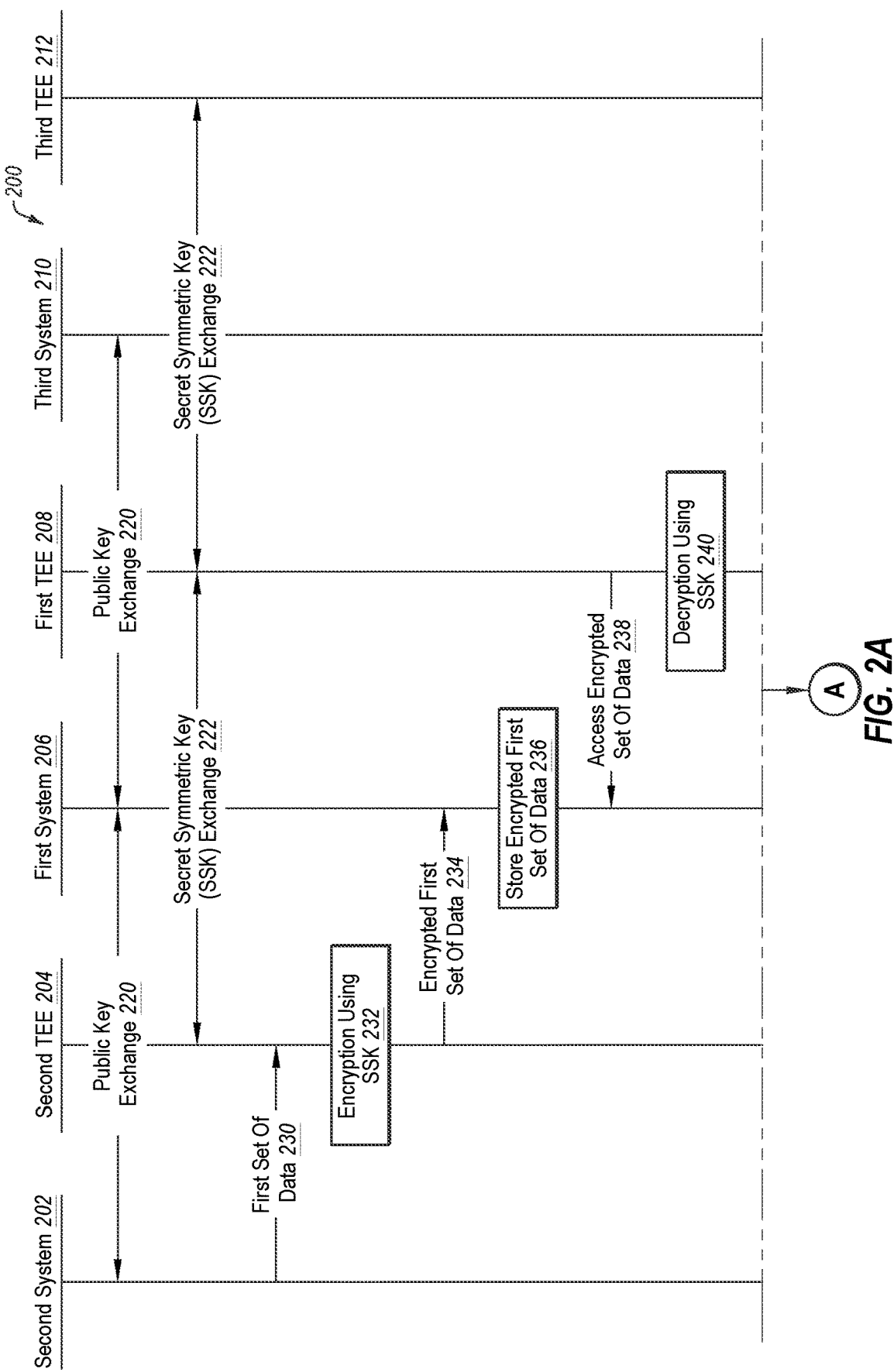
FIG. 2A illustrates example operations associated with a searchable set of data using trusted execution environments.
Figure 2B:
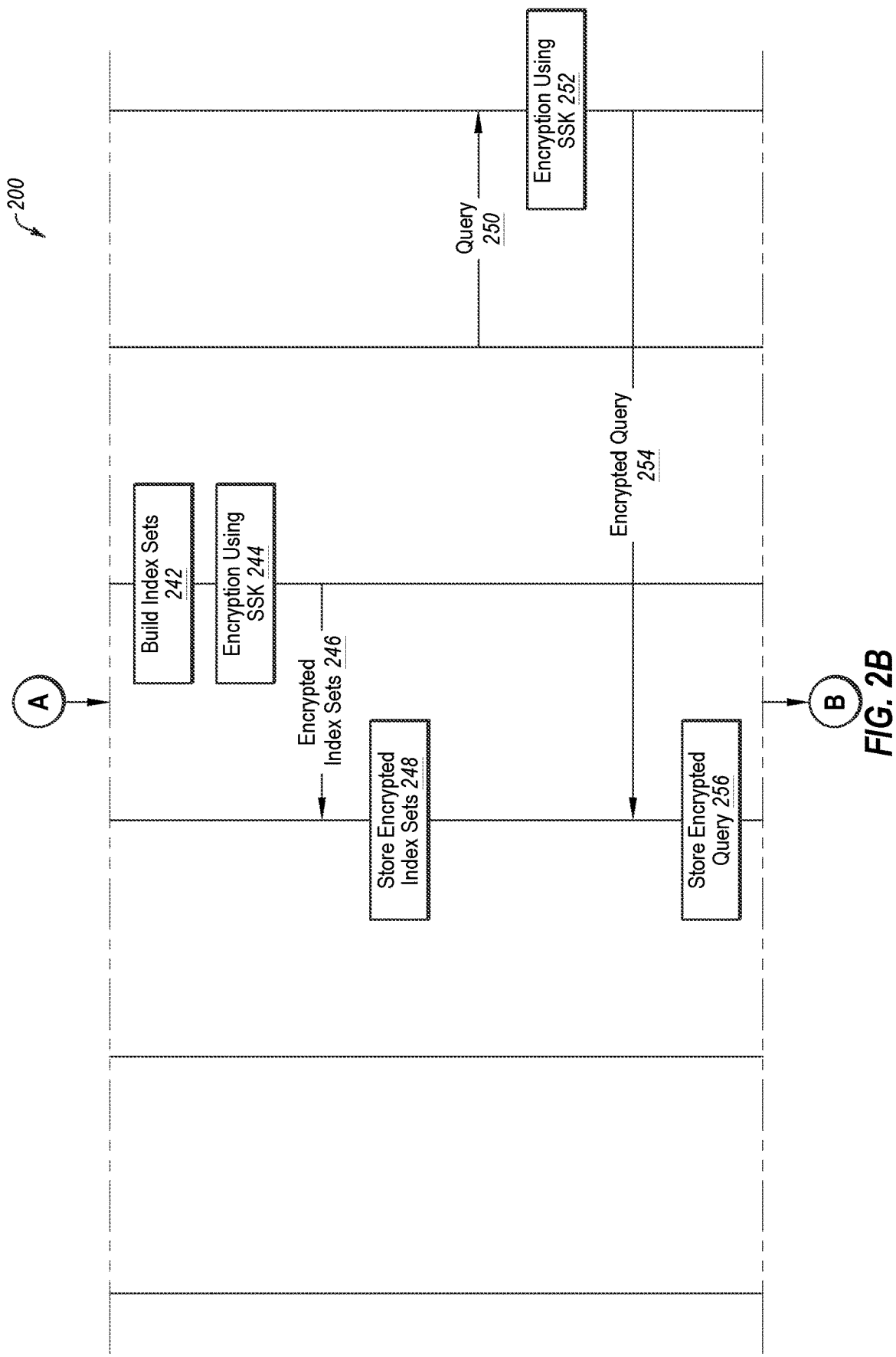
FIG. 2B is a continuation of the example operations of FIG. 2A.
Figure 2C:
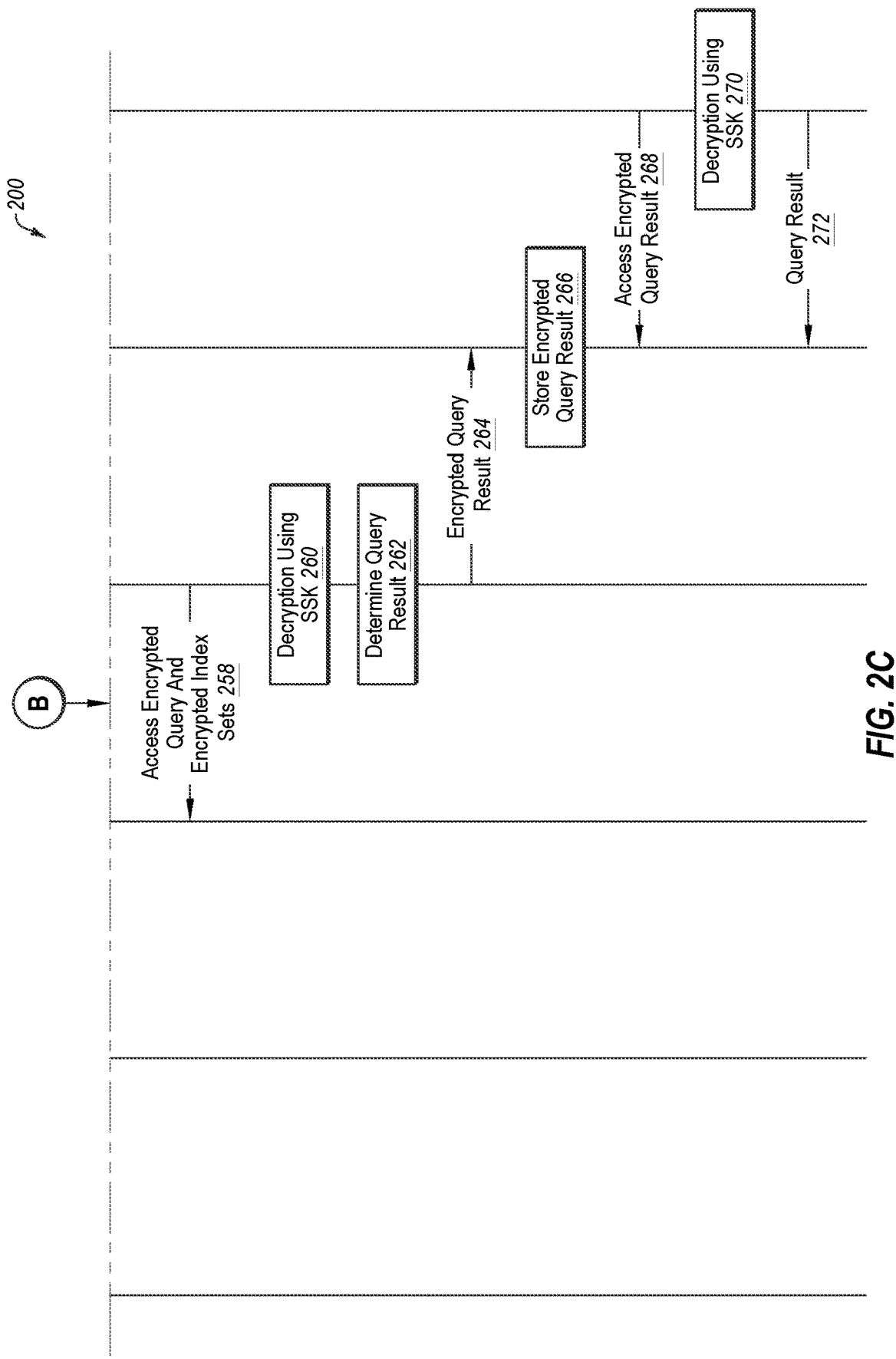
FIG. 2C is a continuation of the example operations of FIG. 2A and FIG. 2B.

FIGS. 2A, 2B, and 2C illustrate example operations 200 related to searchable sets of data using TEEs. The operations 200 may be arranged in accordance with at least one embodiment described in the present disclosure. In the illustrated example, the operations 200 may be between a first system 206, a second system 202, a third system 210, a first TEE 208, a second TEE 204, and a third TEE 212. In some embodiments, the first system 206, the second system 202, the third system 210, the first TEE 208, the second TEE 204, and the third TEE 212 may be analogous to the first system 110, the second system 120, the third system 130, the first TEE 112, the second TEE 122, and the third TEE 132, respectively, of FIG. 1. Alternatively or additionally, the operations 200 may be an example of the operation of the elements of the environment 100 of FIG. 1.

In some embodiments, the operations 200 may be an example of communications and interactions between the first system 206, the second system 202, the third system 210, the first TEE 208, the second TEE 204, and the third TEE 212. In some embodiments, the interactions between the first system 206, the second system 202, and the third system 210 may be performed over a network. For example, the network may be analogous to the network 102 of FIG. 1.

Generally, the operations 200 may relate to storing sensitive data and making the stored sensitive data queryable to other systems and devices. In these and other embodiments, the operations 200 may include encrypting, decrypting, and sharing sensitive data between TEEs to maintain security and privacy of the data. The operations 200 illustrated are not exhaustive but are merely representative of operations 200 that may occur. Furthermore, one operation as illustrated may represent one or more communications, operations, and/or data exchanges.

At operation 220, the first TEE 208 of the first system 206, the second TEE 204 of the second system 202, and the third TEE 212 of the third system 210 may each hold a unique private key of a public key cryptography scheme. In some embodiments, the first TEE 208, the second TEE 204, and the third TEE 212 may direct the first system 206, the second system 202, and the third system 210, respectively, to exchange public keys as part of the public key cryptography scheme. In these and other embodiments, each of the first TEE 208, the second TEE 204, and the third TEE 212 holding a private key may direct the associated system (e.g., the first system 206, the second system 202, and the third system 210, respectively) to initiate the public key exchange of operation 220 with the other systems. For example, the second TEE 204 holding a private key may direct the second system 202 to exchange the corresponding public key with the first system 206 and the third system 210. Alternatively or additionally, the first TEE 208, the second TEE 204, and the third TEE 212 may directly exchange the public key associated with each TEEs private key. For example, the first TEE 208 may exchange the public key corresponding with the first TEE 208 private key with the second TEE 204 and the third TEE 212.

At operation 222, the first TEE 208, the second TEE 204, and the third TEE 212 may exchange a secret symmetric key (SSK) as part of a symmetric key cryptography scheme. In some embodiments, operation 222 may perform similarly to TLS and other similar cryptographic protocols. In some embodiments, the SSK may be exchanged between the first TEE 208, the second TEE 204, and the third TEE 212 using the public key cryptography scheme that exchanged public keys as described in operation 220. For example, the first TEE 208 may encrypt the SSK using the public keys from the second system 202 and the third system 210 and may exchange the SSK with the second TEE 204 and the third TEE 212. Continuing the example, the second TEE 204 may use its private key and the third TEE 212 may use its private key to receive and decrypt the SSK sent from the first TEE 208 and encrypted with the public key from the second system 202 and the public key from the third system 210, respectively. Alternatively or additionally, either of the second TEE 204 or the third TEE 212 may encrypt the SSK using the shared public keys from the first system 206, the second system 202, or the third system 210, as necessary that may then be exchanged with the remaining two systems. For example, the third TEE 212 may encrypt the SSK using the public key from the first system 206 and the public key from the second system 202, and the third TEE 212 may then share the SSK with the first TEE 208 and the second TEE 204. In some embodiments, the first system 206, the second system 202, and the third system 210 may not be privy to the SSK exchanged between first TEE 208, the second TEE 204, and the third TEE 212.

At operation 230, the second system 202 may send a first set of data to the second TEE 204. In some embodiments, the first set of data may include sensitive information which may be desirable to be kept secret. In some embodiments, the first set of data may be organized in rows. In some embodiments, the second system 202 sending the first set of data to the second TEE 204 may include providing access to the second TEE 204 to the first set of data that is stored on the second system 202.

At operation 232, the second TEE 204 may encrypt the first set of data using the SSK. In these and other embodiments, the underlying data of the first set of data encrypted by the second TEE 204 may be inaccessible to the second system 202. Alternatively or additionally, the underlying data of the encrypted first set of data may be inaccessible to systems and devices, except those that have access to the SSK.

In some embodiments, the second TEE 204 may include dummy rows with the first set of data prior to being encrypted, such that the encrypted first set of data includes both the underlying data and the dummy rows. The dummy rows may be rows of data similar in length and structure to rows of data in the first set of data, but otherwise may have no relation to the first set of data. For example, in instances in which a row in the first set of data includes five elements divided into five columns, a dummy row may include five columns filled with data. Additionally, in instances in which the first element in the first column is a number, the first element in the first column of the dummy row may also be a number, and so forth. In some embodiments, the dummy rows may include data sampled from the same distribution as the first set of data, but the dummy rows may be independent from the first set of data. Alternatively or additionally, dummy rows may be added by the second system 202 at operation 230, prior to the first set of data being sent to the second TEE 204. In these and other embodiments, encrypting a first set of data that includes dummy rows combined with the underlying data may make it more difficult for systems, devices, and/or users without access to the SSK to determine the amount of underlying data related to the first set of data being transmitted and/or stored. In some embodiments, the second TEE 204 may provide an indication within the encrypted first set of data that may indicate which rows are included in the first set of data and which rows are dummy rows.

At operation 234, the second TEE 204 may send the encrypted first set of data to the first system 206. In some embodiments, the second TEE 204 may send the encrypted first set of data by directing one or more elements of the second system 202 to send the encrypted first set of data. Additionally or alternatively, the second TEE 204 may send the encrypted first set of data by sending the encrypted first set of data to one or more other elements of the second system 202 and the one or more other elements may send the encrypted first set of data.

In some embodiments, the encrypted first set of data may be sent to the first system 206 over a network. In some embodiments, the network may be analogous to the network 102 of FIG. 1. In some embodiments, the encrypted first set of data may be sent by the second TEE 204 in the aggregate upon completion of the encryption process. For example, a first set of data including rows of patient records may have each row of data encrypted by the second TEE 204, and all the rows of data may be sent to the first system 206.

Alternatively or additionally, the encrypted first set of data may be sent once individual rows are encrypted. For example, a first set of data including rows of patient records may have a first row of data encrypted by the second TEE 204 and sent to the first system 206. In this example, the process of encrypting and sending rows of data may be performed iteratively, until the entire first set of data is encrypted and sent from the second TEE 204 to the first system 206. Alternatively or additionally, updated data of the first set of data that was previously encrypted and sent by the second TEE 204, may be encrypted, and sent as an additional encrypted first set of data. For example, following an encrypted first set of data being sent from the second TEE 204 to the first system 206, a data element of the first set of data may be updated. The updated first set of data may be encrypted by the second TEE 204 and sent to the first system 206 as updated data to the encrypted first set of data previously received by the first system 206.

At operation 236, the first system 206 may store the encrypted first set of data that was received from the second TEE 204. In some embodiments, the encrypted first set of data may be stored in a data storage associated with the first system 206. In some embodiments, the data storage associated with the first system 206 may be analogous to the data storage 114 of FIG. 1. In some embodiments, the encrypted first set of data may be stored in the encrypted state in which it was received. In these and other embodiments, the encrypted first set of data may be stored in oblivious RAM on the first system 206. In some embodiments, the first TEE 208, the second TEE 204, and the third TEE 212 may include a limited amount of memory which may cause the TEEs to store encrypted data on the associated system (i.e., the first TEE to store encrypted data on the first system, etc.). In these and other embodiments, the oblivious RAM may allow a TEE to store encrypted data on the associated system without revealing details of the contents of the encrypted data to the associated system.

In some embodiments, oblivious RAM may be configured to have a data access pattern that is independent from the input received. Additionally, information about the sequence of patterns and/or operations may be concealed to the system hosting the oblivious RAM. For example, oblivious RAM in the first system may be tasked with storing an encryption key and storing a set of data and may use the same access patterns for the two storing operations. In the example, although the encryption key and the set of data may be different sizes and include different data structures, the oblivious RAM may still use the same access patterns to store the encryption key and the set of data.

At operation 238, the first TEE 208 may access the encrypted first set of data that may have been stored on the first system 206. In some embodiments, the first system 206 may send a notification to the first TEE 208 that the encrypted first set of data was received and stored. For example, the first system 206 may send a flag to the first TEE 208 providing an indication that an encrypted first set of data was received and stored.

At operation 240, the first TEE 208 may decrypt the encrypted first set of data using the SSK. In some embodiments, the first TEE 208 may not share or otherwise provide access to the decrypted first set of data such that the decrypted first set of data may be inaccessible to the first system 206, or to any other system or device.

At operation 242, the first TEE 208 may generate index sets of the decrypted first set of data. In some embodiments, the index sets may be data structures that may be related to specific columns included in the first set of data. In some embodiments, the data structure may be called a key. In these and other embodiments, the keys may be a copy of the entries in a column of the first set of data. For example, a medical institution may provide a first set of data that includes columns such as age, height, weight, diagnosis, treatment, and result. In the example, the age column may be a copied as an age key, that may represent an index set. In the event a query requests a specific age from the first set of data, the system may iterate over the age key, not requiring searching the additional columns of the first set of data. In these and other embodiments, the index sets may enable a faster method of searching when compared to searching by iteration through individual rows of data in the decrypted first set of data.

At operation 244, the first TEE 208 may generate encrypted index sets by encrypting the index sets generated at operation 242, using the SSK. In these and other embodiments, the underlying index sets encrypted by the first TEE 208 may be inaccessible to the first system 206. Alternatively or additionally, the underlying index sets of the encrypted index sets may be inaccessible to systems and devices, except those that have access to the SSK.

At operation 246, the first TEE 208 may send the encrypted index sets to the first system 206. In the present disclosure, even though a respective TEE may be part of a corresponding system, reference to a respective TEE sending or receiving data to or from a corresponding system (e.g., the first TEE 208 sending or receiving data to or from the first system 206) may refer to the respective TEE sending data to or receiving data from another portion of the corresponding system that is outside of the respective TEE. In some embodiments, the first TEE 208 may send a notification to the one or more other elements of the first system 206 that the encrypted index sets are ready to be stored. For example, the first TEE 208 may send a flag to the first system 206 providing an indication that an encrypted index sets are ready to be stored.

At operation 248, the first system 206 may store the encrypted index sets received from the first TEE 208. In some embodiments, the encrypted index sets may be stored in a data storage associated with the first system 206. In some embodiments, the data storage associated with the first system 206 may be analogous to the data storage 114 of FIG. 1. In some embodiments, the encrypted index sets may be stored in the encrypted state. In these and other embodiments, the encrypted index sets may be stored in oblivious RAM on the first system 206.

At operation 250, the third TEE 212 may obtain a query. In some embodiments, the query may be obtained from a user. For example, the query may be obtained from a user via a user interface on the third system 210. Alternatively or additionally, the query may be obtained from the third system 210. In these and other embodiments, the query may be constructed so as to request data from a set of data. In some embodiments, the query may be a plaintext query requesting data from a plaintext set of data.

At operation 252, the third TEE 212 may encrypt the query using the SSK. In these and other embodiments, the underlying query of the encrypted query may be inaccessible to systems and devices, except those that have access to the SSK.

In some embodiments, the third TEE 212 may include dummy rows with the query prior to being encrypted, such that the encrypted query includes both the underlying query and the dummy rows. Alternatively or additionally, dummy rows may be added by the third system 210 at operation 250, prior to the query being sent to the third TEE 212. In these and other embodiments, encrypting a query that includes dummy rows combined with the underlying query may make it more difficult for systems, devices, and/or users without access to the SSK to determine the amount of underlying data related to the query being transmitted and/or stored. In some embodiments, the third TEE 212 may provide an indication within the encrypted query that may indicate which rows are included in the query and which rows are dummy rows.

At operation 254, the third TEE 212 may send the encrypted query to the first system 206. In some embodiments, the encrypted first set of data may be sent to the first system 206 over a network. In some embodiments, the network may be analogous to the network 102 of FIG. 1. In some embodiments, the first system 206 may not have access to the underlying query of the encrypted query sent from the third TEE 212 due to the encryption of the query by the third TEE 212 using the SSK and the first system 206 not having access to the SSK. For example, in some instances, the underlying queries of the encrypted queries generated by the third system 210 may not be revealed to the first system 206, or any other system that lacks access to the SSK. Continuing the example, the underlying queries may be seen in the clear by the first TEE 208 and other TEEs that have access to the SSK.

In some embodiments, the encrypted query may be signed with a group signature by the third TEE 212 prior to sending to the first system 206. In some embodiments, a group signature scheme may include a method of anonymous authentication such that the signer, included in a group, is permitted access to information that might otherwise be restricted to systems, devices, and/or users outside the group. Further, a group signature scheme may include a group manager that may add or remove members to or from the group, respectively. In some embodiments, the owner of the first set data may be the group manager. For example, the second system that originally sent the first set of data to the first system may be the group manager, and the second system may grant permission to other systems to query the first set of data by adding the other systems to the group. In some embodiments, the group manager may be able to determine the identity of the signer, even when the authenticating system may be unable to do so. The group signature may provide authentication that the signer is permitted to access and/or query the data in the first set of data stored on the first system 206. The group signature may provide anonymity to the third TEE 212 such that the first system 206 may be unable to determine the system and/or TEE from which the encrypted query originated. In some embodiments, a valid group signature may provide an indication that the system and/or device submitting the encrypted query to the first system 206 is permitted to request information related to the encrypted query.

At operation 256, the first system 206 may store the encrypted query that was received from the third TEE 212. In some embodiments, the encrypted query may be stored in a data storage associated with the first system 206. In some embodiments, the data storage associated with the first system 206 may be analogous to the data storage 114 of FIG. 1. In some embodiments, the encrypted query may be stored in the encrypted state in which it was received. In these and other embodiments, the encrypted query may be stored in oblivious RAM on the first system 206. In some embodiments, in instances in which the encrypted query is signed with a group signature as described at operation 254, the first system 206 may be unable to determine the source of the encrypted query. In these and other embodiments, the first system 206 may store the group signature. In some embodiments, a group manager may be able to use the stored group signature to trace the originating system that submitted the encrypted query.

At operation 258, the first TEE 208 may access the encrypted query and the encrypted index sets, both of which may have been stored in a data storage associated with first system 206. In some embodiments, the first system 206 may send a notification to the first TEE 208 that the encrypted query was received. For example, the first system 206 may send a flag to the first TEE 208 providing an indication that an encrypted query was received. In some embodiments, in instances in which a group signature is used in association with the encrypted query, the first TEE 208 may validate the group signature. In these and other embodiments, the first TEE 208 may not provide a response to an encrypted query that is not signed with a group signature, or whose group signature is invalid.

At operation 260, the first TEE 208 may decrypt the encrypted query and may decrypt the encrypted index sets using the SSK. In some embodiments, the first TEE 208 may not share or otherwise provide access to the decrypted query or the decrypted index sets such that both the decrypted query and the decrypted index sets may be inaccessible to the first system 206, or to any other system or device.

At operation 262, the first TEE 208 may determine a result to the decrypted query. In some embodiments, the first TEE 208 may use the decrypted index sets to determine a query result of the encrypted first set of data. For example, the first TEE 208 may use the decrypted index sets to determine one or more indices of the encrypted first set of data that are responsive to the decrypted query. In some embodiments, the first TEE 208 may determine the indices of the rows responsive to the decrypted query. In these and other embodiments, the first TEE 208 may use the determined indices to select the rows from the encrypted first set of data as the responsive rows to the decrypted query.

In some embodiments, the first TEE 208 may include additional indices with the determined indices as part of the query result, where the additional indices may represent dummy rows included in the query result. In some embodiments, the encrypted first set of data received from the second TEE 204 may have included dummy rows in the set of data which the first TEE 208 may also include as dummy rows in the query result. For example, the encrypted first set of data may have ten rows where the even rows are all dummy rows. Continuing the example, in response to receiving an encrypted query, a TEE may determine that the first and fifth rows are responsive to the encrypted query. Continuing the example, the TEE may indicate that the responsive rows to the query include the first, second, fourth, and fifth rows, where the first and fifth rows are responsive, and the second and fourth rows are dummy rows. Alternatively or additionally, the first TEE 208 may generate dummy rows to be added to the responsive rows, where the generated dummy rows may be rows of data similar in length and structure to the responsive rows. In these and other embodiments, the first TEE 208 may provide an indication in the query result indicating which rows are responsive to the query and which rows are included as dummy rows. For example, a row of data in the query response that includes four elements in four columns, may have a fifth element in a fifth column that provides an indication that the row is either a responsive row or a dummy row.

At operation 264, the first TEE 208 may send the encrypted query result to the third system 210. In some embodiments, the first system 206 may not be able to determine any identifying data regarding the encrypted query result due to the encryption and due to dummy rows added to the encrypted query result. For example, the first system 206 may manage to determine the encrypted query result sent to the third system 210 is a large amount of data, but may not be able to determine how much of the encrypted query result is data from the first set of data or is simply dummy rows. In some embodiments, the encrypted query result may be sent to the third system 210 over a network. In some embodiments, the network may be analogous to the network 102 of FIG. 1. In some embodiments, the third system 210 may not have access to the encrypted query sent from the first TEE 208.

At operation 266, the third system 210 may store the encrypted query that was received from the first TEE 208. In some embodiments, the encrypted query may be stored in a data storage associated with the third system 210. In some embodiments, the data storage associated with the third system 210 may be analogous to the data storage 114 of FIG. 1. In some embodiments, the encrypted query may be stored in the encrypted state in which it was received.

At operation 268, the third TEE 212 may access the encrypted query result that may have been stored by the third system 210. In some embodiments, the third system 210 may send a notification to the third TEE 212 that the encrypted query result was received and stored. For example, the third system 210 may send a flag to the third TEE 212 providing an indication that an encrypted query result was received and stored.

At operation 270, the third TEE 212 may decrypt the encrypted query result using the SSK. In some embodiments, the decrypted query result may be plaintext data. Alternatively or additionally, the decrypted query result may include responsive rows to the query originated by the third system 210, described at operation 250.

At operation 272, the third TEE 212 may send the query result to the third system 210. In some embodiments, the query result may include responsive rows that may have been queried from a set of data. For example, the query result may include data that was desired when the query described at operation 250 was generated.

Modifications, additions, or omissions may be made to the operations 200 without departing from the scope of the present disclosure. For example, the query described in operation 250 may originate from the second system 202 as opposed to the third system 210. In these and other embodiments, the operations following operation 250, specifically operations 252 through 272, may be performed between the second system 202, the second TEE 204, the first system 206, and the first TEE 208, and the third system 210 and the third TEE 212 may not be used at all.

As another example, in some embodiments, the operations 200 may be arranged in a different order or performed at substantially the same time. For example, operations 250 and 252 may be performed at any time after operation 222.

Figure 3A:
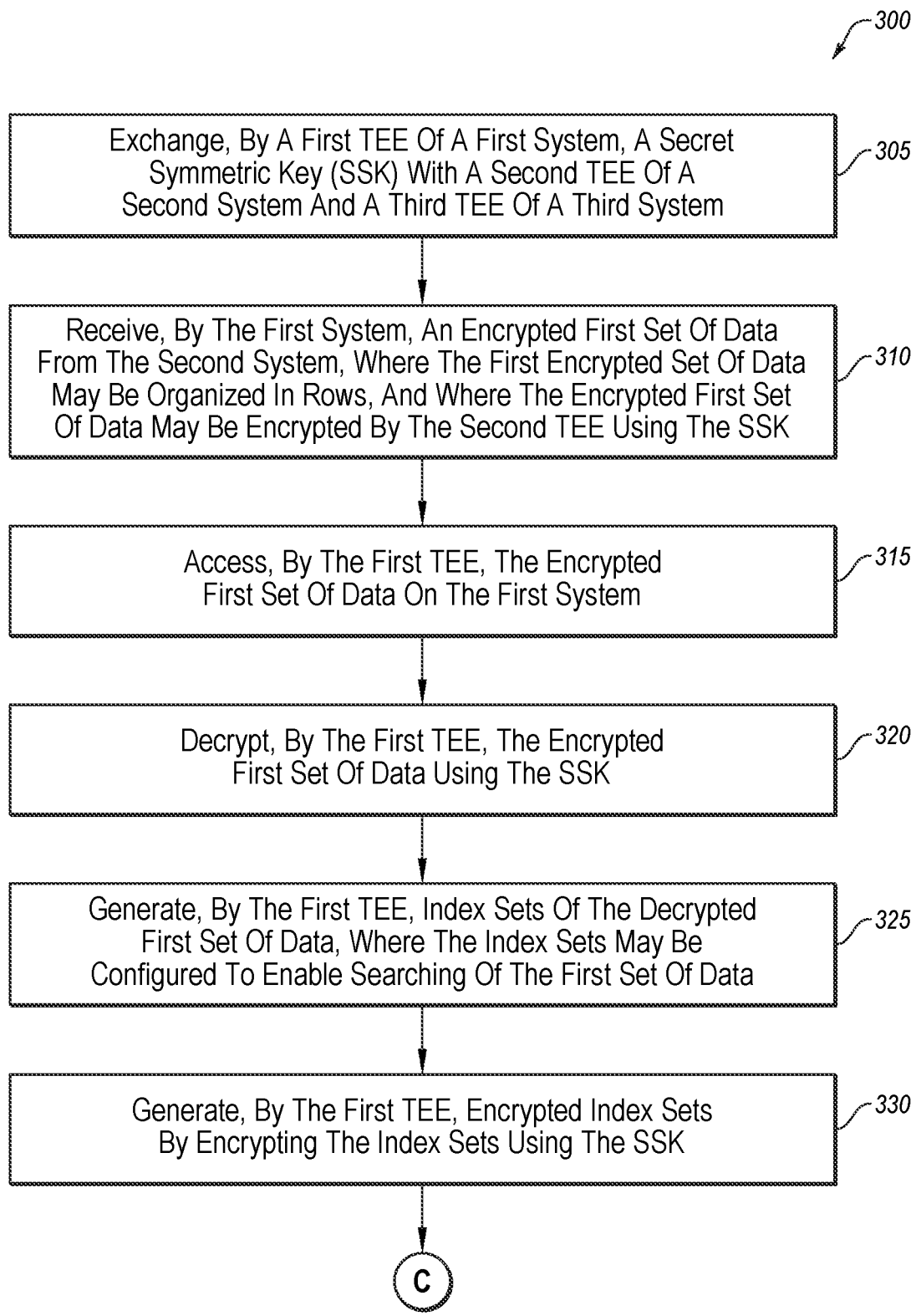
FIG. 3A illustrates a flowchart of an example method of a system receiving, storing, and being queried regarding a set of data using trusted execution environments.
Figure 3B:
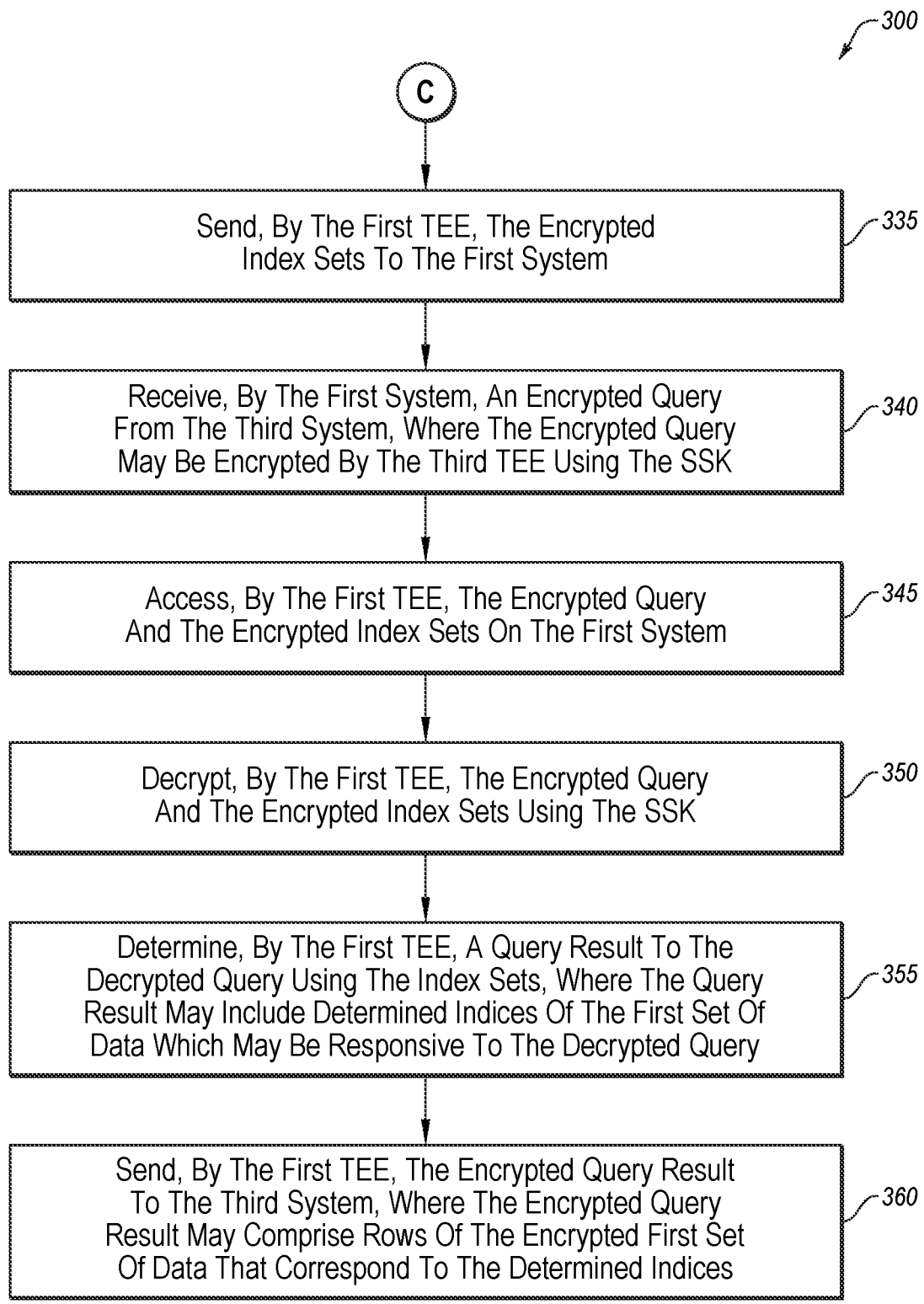
FIG. 3B is a continuation of the flowchart of FIG. 3A.

FIGS. 3A and 3B illustrate a flowchart of an example method 300 of a system receiving, storing, and being queried regarding a set of data using trusted execution environments. The method 300 may be arranged in accordance with at least one embodiment described in the present disclosure. One or more operations of the method 300 may be performed, in some embodiments, by a device or system, such as the first system 110, the second system 120, and/or the third system 130 of FIG. 1, the first system 206, the second system 202, and/or the third system 210 of FIGS. 2A, 2B, and 2C, and/or the system 600 of FIG. 6, or another device, combination of devices, or systems. In these and other embodiments, the method 300 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 300 may begin at block 305 where a first TEE of a first system may exchange a secret symmetric key (SSK) with a second TEE of a second system and a third TEE of a third system. For example, the first TEE may send the SSK to the second TEE and the third TEE. In some embodiments, the first system may exchange public keys with the second system and the third system in a public key cryptography scheme prior to exchanging the SSK. The exchange of public keys between the first system, the second system, and the third system, along with the corresponding first TEE, second TEE, and third TEE, respectively, may be analogous to operation 220 described in FIGS. 2A, 2B and 2C. For example, the first TEE may hold a private key and may direct the first system to share the corresponding public key with the second system and the third system. In some embodiments, the first TEE may exchange the SSK with the second TEE and the third TEE using the public key cryptography scheme. In these and other embodiments, the first TEE may not share the SSK with the first system. In some embodiments, the first system may not have access to the SSK from the first TEE, which may allow the first TEE to maintain a black box relationship with the first system such that the first system may be unable to determine any details of the underlying instructions or data being processed in the first TEE.

At block 310, the first system may receive an encrypted first set of data from the second system, where the encrypted first set of data may be organized in rows, and where the encrypted first set of data may be encrypted by the second TEE of the second system using the SSK. In some embodiments, the first system may not be able to access the encrypted first set of data due to the encryption. For example, the encrypted first set of data may be indecipherable to the first system in instances where the first system does not have access to the SSK. Alternatively or additionally, the encrypted first set of data may be indecipherable to any system that does not have access to the SSK. In some embodiments, the first system may store the encrypted first set of data in a data storage device. For example, the first system may store the encrypted first set of data without determining the contents of the underlying data. In some embodiments, the encrypted first set of data may include dummy rows that may add a layer of privacy. For example, a first set of data may include dummy rows that may be substantially equal in amount to the number of rows included in the first set of data. Alternatively or additionally, the number of dummy rows included in the first set of data may be more than or less than the number of rows of data included in the first set of data.

In some embodiments, the first system may receive additional rows from the second system, and the additional rows may be in a substantially similar format as the encrypted first set of data received. In some embodiments, the additional rows received may be more or less rows than the encrypted first set of data.

At block 315, the first TEE may access the encrypted first set of data on the first system. In some embodiments, the first system may provide a notification to the first TEE that the encrypted first set of data is available to be accessed.

At block 320, the first TEE may decrypt the encrypted first set of data using the SSK. In some embodiments, the decrypted first set of data may be kept private by the first TEE such that the first system may be restricted from accessing the first set of data while in a decrypted state.

At block 325, the first TEE may generate index sets of the decrypted first set of data, where the index sets may be configured to enable searching of the first set of data.

At block 330, the first TEE may generate encrypted index sets by encrypting the index sets using the SSK.

At block 335, the first TEE may send the encrypted index sets to the first system. In some embodiments, the first system may store the encrypted index sets received from the first TEE.

At block 340, the first system may receive an encrypted query from the third system, where the encrypted query may be encrypted by the third TEE of the third system using the SSK. In some embodiments, the first system may store the encrypted query. In some embodiments, the encrypted query may include a group signature, which may indicate to the first system the encrypted query is permitted to access the encrypted first set of data. In some embodiments, encrypted queries that include no group signature or encrypted queries that are signed with an invalid group signature, may not be stored by the first system. Alternatively or additionally, the first system may not store a received query that is not encrypted.

At block 345, the first TEE may access the encrypted query and the encrypted index sets on the first system. In some embodiments, the first system may provide a notification to the first TEE that the encrypted query is available to be accessed.

At block 350, the first TEE may decrypt the encrypted query and the encrypted index sets using the SSK. In some embodiments, the first system may not be permitted by the first TEE to access the decrypted query or the decrypted index sets.

At block 355, the first TEE may determine a query result to the decrypted query using the decrypted index sets, where the query result may include determined indices of the first set of data which may be responsive to the decrypted query. Determining a query result may be analogous to operation 262 described in FIG. 2C. In some embodiments, determining the query result may include the first TEE using the decrypted index sets to determine indices that are responsive to the decrypted query. In these and other embodiments, the first TEE may include additional indices in the query result, where the additional indices may include dummy rows. In some embodiments, the dummy rows may be included in the first set of data. Alternatively or additionally, the first TEE may generate extra rows of data to be included as additional indices in the query result.

At block 360, the first TEE may send the encrypted query result to the third TEE of the third system, where the encrypted query result may comprise rows of the encrypted first set of data that correspond to the determined indices.

Modifications, additions, or omissions may be made to FIGS. 3A and 3B without departing from the scope of the present disclosure. For example, the functions and/or operations performed may be implemented in differing order, or may be combined into fewer functions and operations, or expanded into additional functions and operations without detracting from the essence of the disclosed embodiments. For example, the method 300 may include more or fewer elements than those illustrated and described in the present disclosure.

Figure 4:
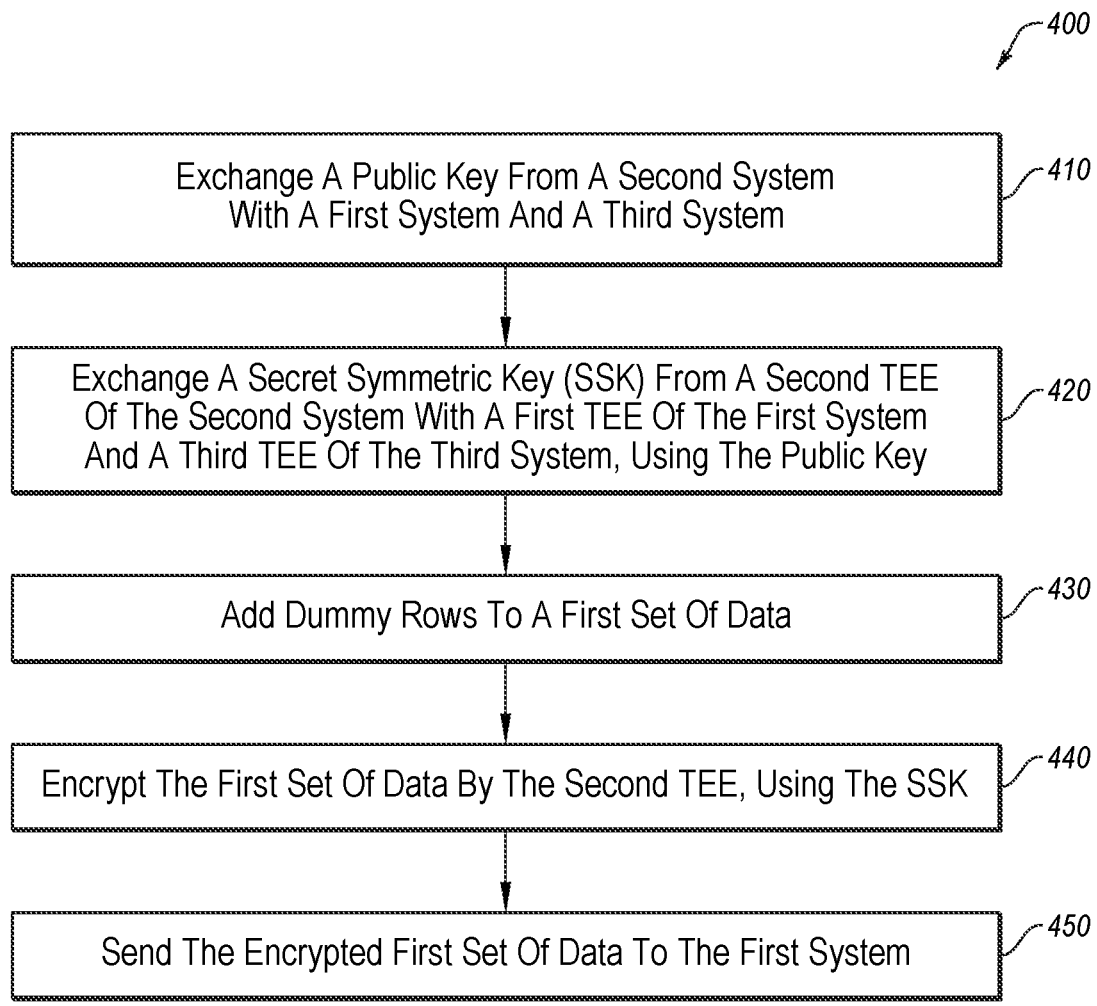
FIG. 4 illustrates a flowchart of a second system encrypting and sending data to a first system.

FIG. 4 illustrates a flowchart of an example method 400 of a second system encrypting and sending data to a first system. The method 400 may be arranged in accordance with at least one embodiment described in the present disclosure. One or more operations of the method 400 may be performed, in some embodiments, by a device or system, such as the first system 110, the second system 120, and/or the third system 130 of FIG. 1, the first system 206, the second system 202, and/or the third system 210 of FIGS. 2A, 2B and 2C, and/or the system 600 of FIG. 6, or another device, combination of devices, or systems. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 410 where a second system may exchange a public key with a first system and a third system in a public key encryption scheme. In some embodiments, a second TEE of the second system may maintain its respective private key associated with the public key that the second system previously had shared. In some embodiments, the second TEE may direct the second system to share the public key associated with its private key.

At block 420, the second TEE may exchange a secret symmetric key (SSK) with the first TEE and the third TEE. In some embodiments, the SSK exchanged between the TEEs may be performed using the public key encryption scheme from block 410. Block 420 may be similar or comparable to block 305 of FIG. 3A.

At block 430, dummy rows may be added to a first set of data. In some embodiments, the second system may add the dummy rows to the first set of data. Alternatively or additionally, the second TEE may add the dummy rows to the first set of data. In some embodiments, the dummy rows may have the same data structure as the data in the first set of data. For example, in instances in which a row in a first set of data included five elements disposed in five columns, a dummy row may include five elements disposed in five columns. In some embodiments, the data type of the dummy row may be identical to the data type of rows in the first set of data. For example, in instances in which a first set of data includes three rows with a data type for each column in the row including a number, a character, and a string, respectively, the data type for a dummy row may include a number, a character, and a string, thus matching the data types of the first set of data. In some embodiments, the dummy rows may include data sampled from the same distribution as the first set of data, but the dummy rows may be independent from the first set of data.

At block 440, the second TEE may encrypt the first set of data using the SSK to generate the encrypted first set of data. In some embodiments, the encrypted first set of data may be inaccessible to systems and/or devices that do not have access to the SSK.

At block 450, the second TEE may send the encrypted first set of data to the first system. In some embodiments, the second TEE may instruct the second system to send the encrypted first set of data to the first system. In these and other embodiments, the encrypted first set of data may be sent over a network. In some embodiments, the network may be analogous to the network 102 of FIG. 1.

Modifications, additions, or omissions may be made to FIG. 4 without departing from the scope of the present disclosure. For example, the functions and/or operations performed may be implemented in differing order, or may be combined into fewer functions and operations, or expanded into additional functions and operations without detracting from the essence of the disclosed embodiments. For example, the method 400 may include more or fewer elements than those illustrated and described in the present disclosure.

Figure 5:
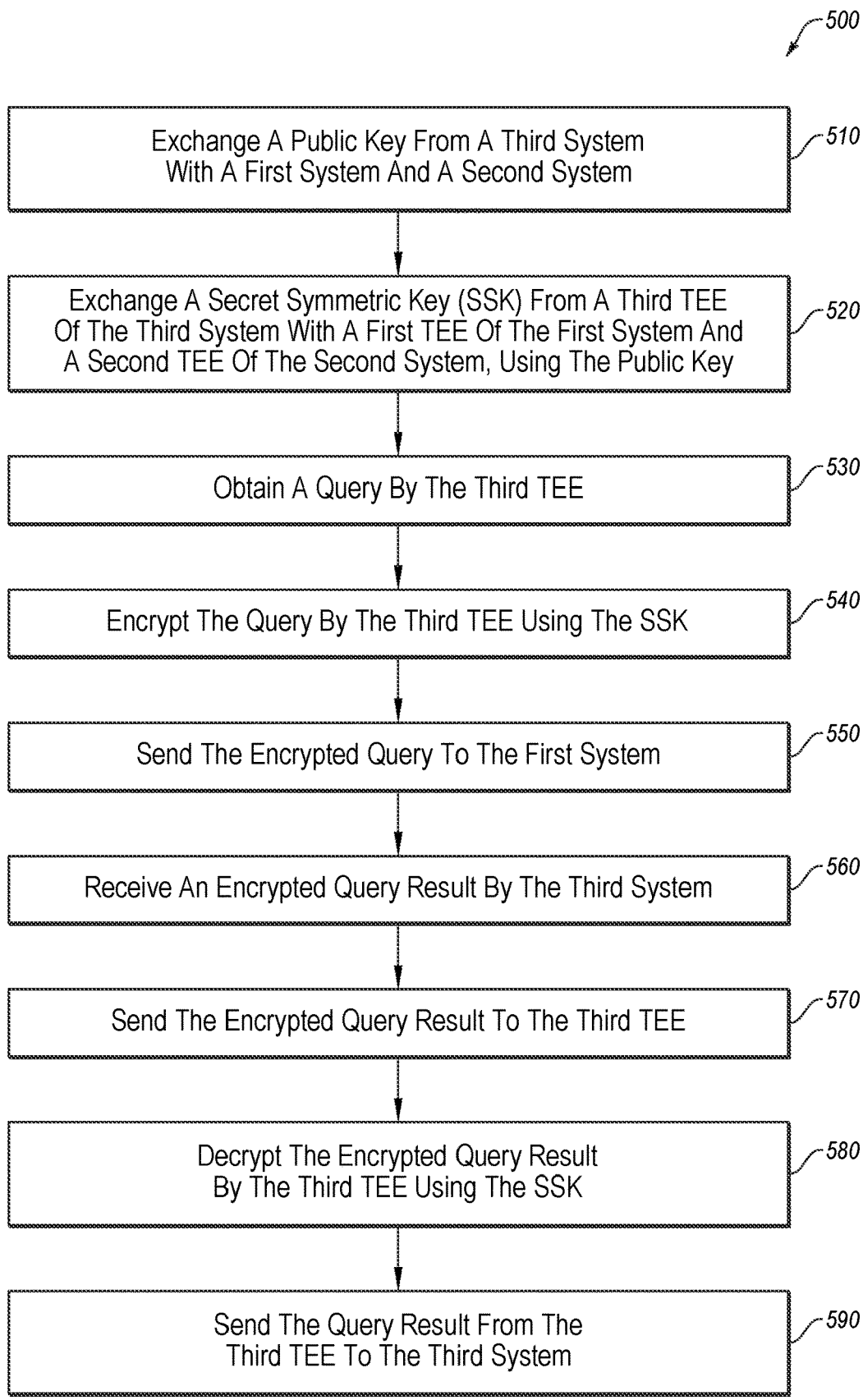
FIG. 5 illustrates a flowchart of a third system encrypting and sending a query to a first system and receiving and decrypting a query result from the first system.

FIG. 5 illustrates a flowchart of an example method 500 of a third system encrypting and sending a query to a first system and receiving and decrypting a query result from the first system. The method 500 may be arranged in accordance with at least one embodiment described in the present disclosure. One or more operations of the method 500 may be performed, in some embodiments, by a device or system, such as the first system 110, the second system 120, and/or the third system 130 of FIG. 1, the first system 206, the second system 202, and/or the third system 210 of FIGS. 2A, 2B and 2C, and/or the system 600 of FIG. 6, or another device, combination of devices, or systems. In these and other embodiments, the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 500 may begin at block 510 where a third system may exchange a public key with a first system and a second system in a public key encryption scheme. In some embodiments, a third TEE of the third system may maintain its respective private key associated with the public key that the third system previously had shared. In some embodiments, the third TEE may direct the third system to share the public key associated with its private key. The block 510 may be similar or comparable to the block 410 of FIG. 4.

At block 520, the third TEE may exchange a secret symmetric key (SSK) with the first TEE and the second TEE. In some embodiments, the SSK exchanged between the TEEs may be performed using the public key encryption scheme from block 510. Block 520 may be similar or comparable to block 305 of FIG. 3A.

At block 530, the third TEE may obtain a query. In some embodiments, the query may be obtained from a user. For example, the query may be obtained from a user via a user interface on the third system. Alternatively or additionally, the query may be obtained from the third system. In these and other embodiments, the query may be constructed so as to request data from a set of data. In some embodiments, the query may be a plaintext query requesting data from a plaintext set of data.

At block 540, the third TEE may encrypt the query using the SSK. In these and other embodiments, the underlying query of the encrypted query may be inaccessible to systems and devices, except those that have access to the SSK. In some embodiments, the third TEE may include dummy rows with the query prior to being encrypted, such that the encrypted query includes both the underlying query and the dummy rows. Alternatively or additionally, dummy rows may be added by the third system, prior to the query being sent to the third TEE. In some embodiments, the third TEE may provide an indication within the encrypted query that may indicate which rows are included in the query and which rows are dummy rows.

At block 550, the third TEE may send the encrypted query to the first system. In some embodiments, the encrypted first set of data may be sent to the first system over a network. In some embodiments, the first system may not have access to the underlying query of the encrypted query sent from the third TEE due to the encryption of the query by the third TEE using the SSK and the first system not having access to the SSK.

At block 560, the third system may receive an encrypted query result from the first system. In some embodiments, the third system, at the present time, may not be able to determine any identifying data regarding the encrypted query due to the encryption and due to dummy rows added to the encrypted query result. For example, the third system may determine the encrypted query result sent from the first system is a large amount of data, but may not be able to determine how much of the encrypted query result is data from a first set of data or is simply dummy rows. In some embodiments, the encrypted query result may be received from the first system over a network.

At block 565, the third system may store the encrypted query that was received from the first TEE. In some embodiments, the encrypted query may be stored in a data storage associated with the third system. In some embodiments, the encrypted query may be stored in the encrypted state in which it was received.

At block 570, the third TEE may access the encrypted query result that may have been stored by the third system. In some embodiments, the third system may send a notification to the third TEE that the encrypted query result was received and stored. For example, the third system may send a flag to the third TEE providing an indication that an encrypted query result was received and stored.

At block 580, the third TEE may decrypt the encrypted query result using the SSK. In some embodiments, the decrypted query result may be plaintext data. Alternatively or additionally, the decrypted query result may include responsive rows to the query originated by the third system, described at block 530.

At block 590, the third TEE may send the query result to the third system. In some embodiments, the query result may include rows of a set of data that may have been determined to be a result of the query, such as the obtained query described in block 530. For example, the query result may include data that was desired when the query described at block 530 was generated.

Modifications, additions, or omissions may be made to FIG. 5 without departing from the scope of the present disclosure. For example, the functions and/or operations performed may be implemented in differing order, or may be combined into fewer functions and operations, or expanded into additional functions and operations without detracting from the essence of the disclosed embodiments. For example, the method 500 may include more or fewer elements than those illustrated and described in the present disclosure. For example, the query results obtained by the third system may be presented to a user by the third system via a user interface (e.g., a display, etc.).

Figure 6:
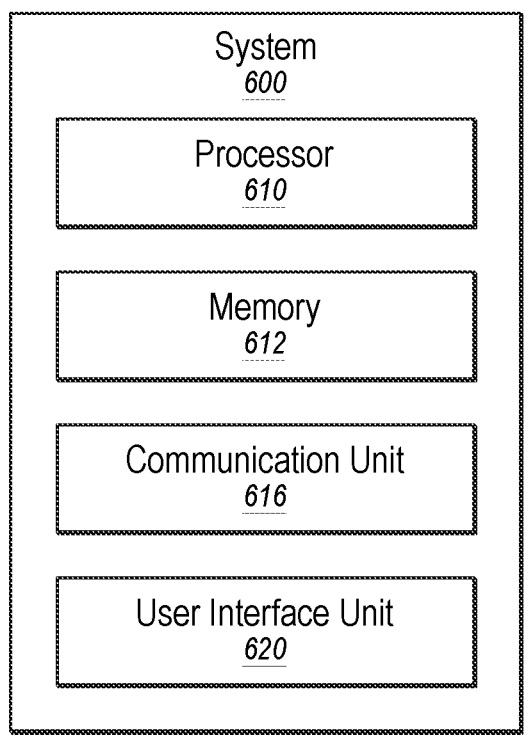
FIG. 6 illustrates an example computing system.

FIG. 6 is a block diagram illustrating an example computing device 600 that is arranged to be used in a private searchable set of data, according to at least one embodiment of the present disclosure. The system 600 may include a processor 610, memory 612, a communication unit 616, and a user interface unit 620, which all may be communicatively coupled. In some embodiments, the system 600 may be part of any of the systems or devices described in this disclosure.

For example, the system 600 may be part of the first system of FIG. 1 and may be configured to perform one or more of the operations described above with respect to the first system. As another example, the system 600 may be part of the second system, or the third system of FIG. 1 and may be configured to perform one or more of the functions described above.

Generally, the processor 610 may include any suitable special-purpose or general-purpose computer, computing entity, or processing device including various computer hardware or software modules and may be configured to execute instructions stored on any applicable computer-readable storage media. For example, the processor 610 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that the processor 610 may include any number of processors distributed across any number of networks or physical locations that are configured to perform individually or collectively any number of operations described herein. In some embodiments, the processor 610 may interpret and/or execute program instructions and/or process data stored in the memory 612. In some embodiments, the processor 610 may execute the program instructions stored in the memory 612.

For example, in some embodiments, the processor 610 may execute program instructions stored in the memory 612 that are related to a private searchable set of data such that the system 600 may perform or direct the performance of the operations associated therewith as directed by the instructions. In these and other embodiments, the instructions may be used to perform one or more operations described above with respect to FIGS. 2-5.

The memory 612 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 610.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 610 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re *Nuijten,* 500 F.3d 1346 (Fed. Cir. 2007). Combinations of the above may also be included within the scope of computer-readable media.

The communication unit 616 may include any component, device, system, or combination thereof that is configured to transmit or receive information over a network. In some embodiments, the communication unit 616 may communicate with other devices at other locations, the same location, or even other components within the same system. For example, the communication unit 616 may include a modem, a network card (wireless or wired), an infrared communication device, a wireless communication device (such as an antenna), and/or chipset (such as a Bluetooth® device, an 802.6 device (e.g., Metropolitan Area Network (MAN)), a WiFi device, a WiMax device, cellular communication facilities, etc.), and/or the like. The communication unit 616 may permit data to be exchanged with a network and/or any other devices or systems described in the present disclosure.

The user interface unit 620 may include any device to allow a user to interface with the system 600. For example, the user interface unit 620 may include a mouse, a track pad, a keyboard, buttons, camera, and/or a touchscreen, among other devices. The user interface unit 620 may receive input from a user and provide the input to the processor 610.

Modifications, additions, or omissions may be made to the system 600 without departing from the scope of the present disclosure. For example, in some embodiments, the system 600 may include any number of other components that may not be explicitly illustrated or described. Further, depending on certain implementations, the system 600 may not include one or more of the components illustrated and described.

As indicated above, the embodiments described herein may include the use of a special purpose or general-purpose computer (e.g., the processor 610 of FIG. 6) including various computer hardware or software modules, as discussed in greater detail below. Further, as indicated above, embodiments described herein may be implemented using computer-readable media (e.g., the memory 612 of FIG. 6) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
   exchanging, by a first trusted execution environment (TEE) of a first system, a secret symmetric key (SSK) with a second TEE of a second system and a third TEE of a third system;
   receiving, by the first system, an encrypted first set of data from the second system, the first encrypted set of data organized in rows, the encrypted first set of data being encrypted by the second TEE using the SSK;
   accessing, by the first TEE, the encrypted first set of data on the first system;
   decrypting, by the first TEE, the encrypted first set of data using the SSK;
   receiving, by the first system, an encrypted query from the third system, the encrypted query being encrypted by the third TEE using the SSK;
   accessing, by the first TEE, the encrypted query on the first system;
   decrypting, by the first TEE, the encrypted query using the SSK;
   determining, by the first TEE, a query result to the decrypted query, the query result including determined indices of the first set of data responsive to the decrypted query; and
   sending, by the first TEE, the encrypted query result to the third system, the encrypted query result comprising rows of the encrypted first set of data that correspond to the determined indices.

2. The method of claim 1, further comprising exchanging the SSK between the first TEE of the first system, the second TEE of the second system, and the third TEE of the third system using public key cryptography.

3. The method of claim 1, further comprising storing, at the first system, the encrypted first set of data.

4. The method of claim 1, wherein the encrypted first set of data received from the second system includes dummy rows.

5. The method of claim 4, wherein the dummy rows are added to the first set of data by the second system.

6. The method of claim 4, wherein the dummy rows are added to the encrypted first set of data by the second TEE.

7. The method of claim 1, wherein the first TEE of the first system includes additional indices to the determined indices, the additional indices acting as dummy rows to the encrypted query result that is sent to the third system.

8. The method of claim 1, wherein the received encrypted query is anonymous to the first system as to an originating system of the received encrypted query.

9. The method of claim 8, wherein the received anonymous encrypted query is signed with a group signature.

10. The method of claim 1, further comprising:
    generating, by the first TEE, index sets of the decrypted first set of data, the index sets configured to enable searching of the first set of data;
    generating, by the first TEE, encrypted index sets by encrypting the index sets using the SSK; and
    sending, by the first TEE, the encrypted index sets to the first system.

11. A non-transitory computer-readable storage medium having computer-executable instructions stored thereon that are executable by a processor device to perform or control performance of operations comprising:
    exchanging, by a first trusted execution environment (TEE) of a first system, a secret symmetric key (SSK) with a second TEE of a second system and a third TEE of a third system;
    receiving, by the first system, an encrypted first set of data from the second system, the first encrypted set of data organized in rows, the encrypted first set of data being encrypted by the second TEE using the SSK;
    accessing, by the first TEE, the encrypted first set of data on the first system;
    decrypting, by the first TEE, the encrypted first set of data using the SSK;
    receiving, by the first system, an encrypted query from the third system, the encrypted query being encrypted by the third TEE using the SSK;
    accessing, by the first TEE, the encrypted query on the first system;
    decrypting, by the first TEE, the encrypted query using the SSK;
    determining, by the first TEE, a query result to the decrypted query, the query result including determined indices of the first set of data responsive to the decrypted query; and
    sending, by the first TEE, the encrypted query result to the third system, the encrypted query result comprising rows of the encrypted first set of data that correspond to the determined indices.

12. The non-transitory computer-readable storage medium of claim 11, further comprising exchanging the SSK between the first TEE of the first system, the second TEE of the second system, and the third TEE of the third system using public key cryptography.

13. The non-transitory computer-readable storage medium of claim 11, further comprising storing, at the first system, the encrypted first set of data.

14. The non-transitory computer-readable storage medium of claim 11, wherein the encrypted first set of data received from the second system includes dummy rows.

15. The non-transitory computer-readable storage medium of claim 14, wherein the dummy rows are added to the first set of data by the second system.

16. The non-transitory computer-readable storage medium of claim 14, wherein the dummy rows are added to the encrypted first set of data by the second TEE.

17. The non-transitory computer-readable storage medium of claim 11, wherein the first TEE of the first system includes additional indices to the determined indices, the additional indices acting as dummy rows to the encrypted query result that is sent to the third system.

18. The non-transitory computer-readable storage medium of claim 11, wherein the received encrypted query is anonymous to the first system as to an originating system of the received encrypted query.

19. The non-transitory computer-readable storage medium of claim 18, wherein the received anonymous encrypted query is signed with a group signature.

20. The non-transitory computer-readable storage medium of claim 11, further comprising:

generating, by the first TEE, index sets of the decrypted first set of data, the index sets configured to enable searching of the first set of data;

generating, by the first TEE, encrypted index sets by encrypting the index sets using the SSK; and sending, by the first TEE, the encrypted index sets to the first system.

* * * * *